Oct. 31, 1967   W. F. PORTER   3,350,184
FIBER ATTENUATING APPARATUS
Filed June 7, 1965                                                 2 Sheets-Sheet 1

WILLIAM F. PORTER
INVENTOR.
BY John Kenneth Wise
ATTORNEY

United States Patent Office 3,350,184
Patented Oct. 31, 1967

3,350,184
FIBER ATTENUATING APPARATUS
William F. Porter, Roselle, Ill., assignor to United States Gypsum Company, a corporation of Delaware
Filed June 7, 1965, Ser. No. 461,733
9 Claims. (Cl. 65—14)

This invention relates to apparatus for attenuating glass fibers and more particularly for an apparatus to be used with a centrifugal rotor to attenuate the fibers discharged therefrom.

In forming glass fibers, it is well known to supply glass melt through a hollow vertical shaft to perforate centrifugal rotor which forms coarse fibers. These fibers are passed through a region having gases of controlled temperature anl velocity and which surrounds the rotor whereby the fiber diameter is reduced. Most often, the complex equipment needed to maintain the attenuating conditions occupies all the space above the fiberizing rotor and around its hollow vertical shaft.

When making non-woven batts, insulation and the like from glass fibers, improved felting is obtained if the rotor can be operated on a shaft which is nearly horizontal. These advantages are not realized merely by turning a vertical shaft spinner on its side because the glass cannot be satisfactorily introduced to the fiberizing rotor in this position, inasmuch as it will not readily flow through the hollow shaft and the bulky equipment for maintaining the attenuating conditions so limits access to the rotor that direct introduction of the glass is impractical.

It is an object of this invention, therefore, to provide attenuating apparatus which is especially suitable for use with a fiberizing rotor operating on a substantially horizontal shaft. It is a further object of this invention to provide an attenuating apparatus which renders substantially all of the rear of the fiberizing rotor accessible during the fiberizing operation. It is a still further object of this invention to provile an attenuating apparatus whose structure is substantially all radially outward of the fiberizing rotor. It is a still further object of this invention to provide a fluid cooled attenuating apparatus in which at least a portion of the coolant is discharged as an attenuating medium.

Figure 1:
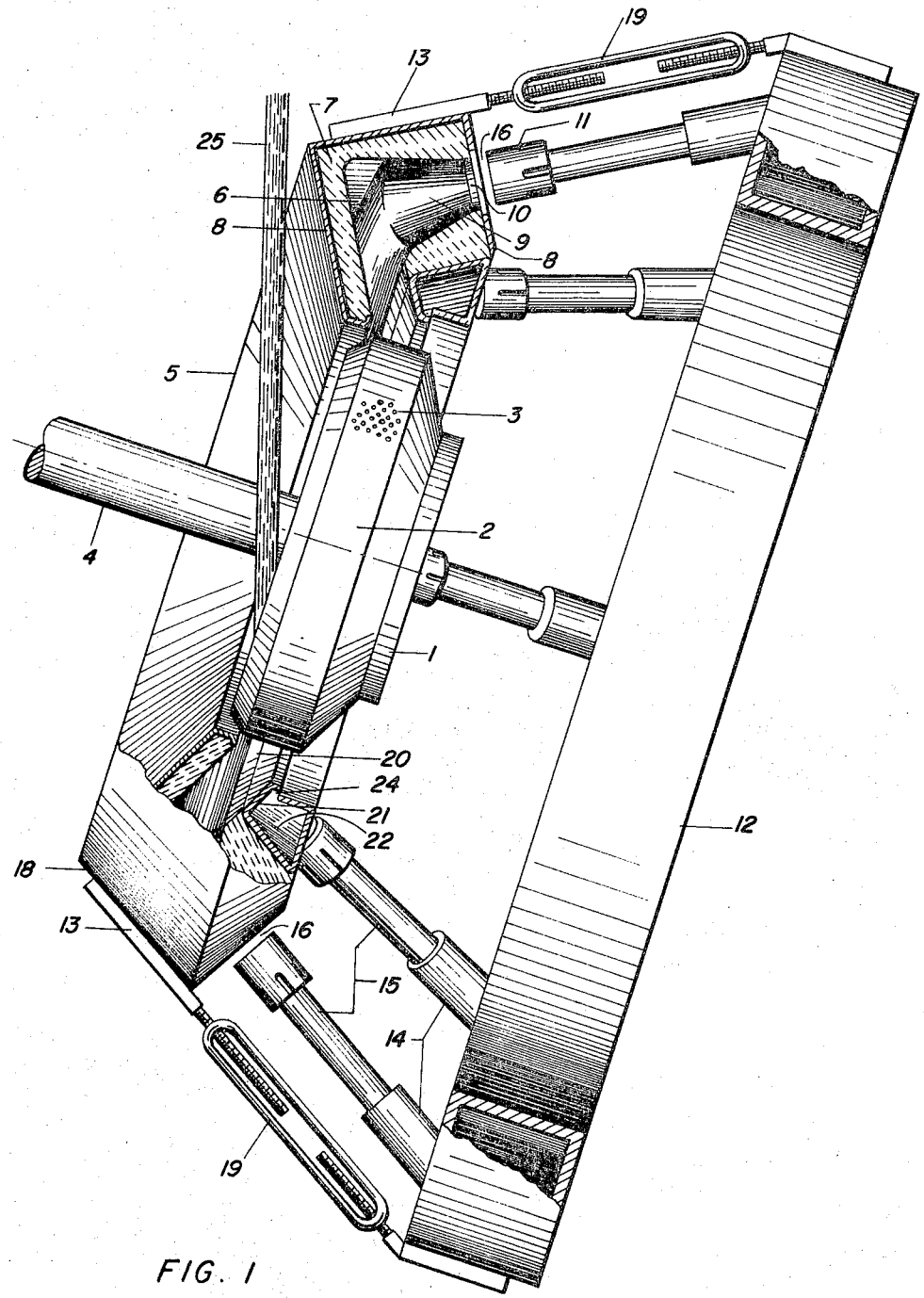
Figure 2:
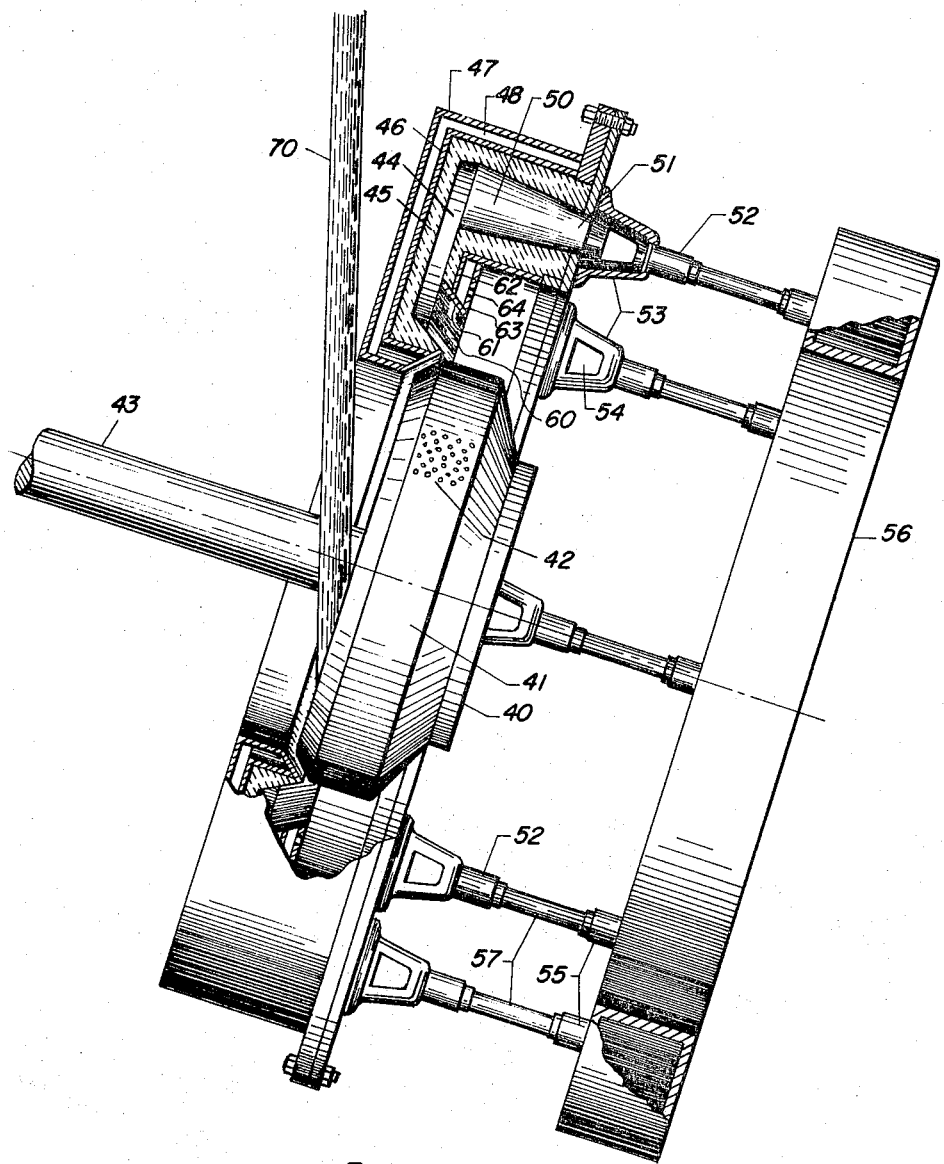

These and other objects and advantages of this invention will be more fully understood when reference is made to the detailed description thereof which follows and to the accompanying drawings in which FIGURE 1 and FIGURE 2 disclose embodiments of the invention.

In general, the advantages and objects of this invention are realized through the provision of an annular combustion chamber surrounding the fiberizing rotor. A plurality of ports are provided into which is directed a stream containing gas fuel premixed with a portion of the oxidant necessary for combustion. The flow of the premixed stream induces into the combustion chamber the balance of the air for complete oxidation. Discharge means are provided to convey the combustion products from the burner chamber to the working area of the rotor in a high temperature, low velocity stream. At least a portion of the discharge means is comprised of a fluid cooled wall and provisions are made to discharge the coolant in a high velocity stream for attenuating the fibers. In this way, the heat energy which is absorbed from the discharge means is not lost but contributes to the energy available for attenuating the fibers.

Referring now to FIGURE 1 of the drawings, there is illustrated a fiberizing rotor mounted on a shaft at a slight angle to the horizontal surrounded by the attenuating apparatus which is partly broken away and sectioned to reveal the interior construction. In the illustration, a rotor 1 having a perforate wall 2 bearing a large number of fiber forming orifices 3 in several rows is shown mounted on the shaft 4.

Surrounding the rotor is an annular burner 5 which has a combustion chamber 6 with a generally rectangular cross section. The burner chamber is defined by ceramic lining 7 supported by metallic walls including radial walls 8 and annular wall 18. A number of truncated conical ports 9 are located around the burner chamber near its outer edge. The smaller end of the port 10 forms an inlet into which nozzle 11 directs a flame burning fuel which has been premixed with a portion of the oxidant necessary for combustion. The divergent walls of the port 9 accommodate the expanding combustion products. As shown in FIGURE 1, the nozzles are separated from the ports by a space 16. An annular manifold 12 is supported from the burner ring by a plurality of brackets 13 which have adjustment means 19 adapted to accurately position the nozzles with respect to the inlet ports. Each nozzle is supported by a coupling 14 welded to the manifold and by a connecting nipple 15.

An annular port 20 to discharge combustion products is defined in part by the metallic wall 21 which is adapted to be cooled by a fluid in the chamber 22 supplied by means not shown. Discharge of the fluid from this chamber is by an annular slot 24.

In operating this apparatus, the manifold was first positioned accurately by manipulating the adjustable supports 19 so that the nozzles were separated by a small distance 16 from the ports 10. Fuel was premixed with from about 70 to 90% of the total amount of oxidant necessary for combustion and fed to manifold 12 and thence to the nozzles 11 where it was ignited and directed into the ports 10. The velocity of the burning gases was such that sufficient air to complete the burning of the fuel was aspirated through the passageway 16 between each burner and its corresponding port. The combustion products issued from the discharge opening 20 across the wall of the rotor which was driven at a high speed by means not shown. When the wall reached nearly operating temperature, a stream of glass 25 was directed to the interior of the rotor from whence centrifugal force caused fibers to be drawn from the orifices 3. Steam under pressure was admitted to the chamber 22 by means not shown which cooled the wall 20 of the discharge means and issued from the port 24 as a high velocity stream to attenuate the fibers.

Referring now to FIGURE 2, a second embodiment of the invention is illustrated wherein a rotor 40 having a side wall 41 bearing a plurality of fiber forming orifices 42 is mounted on a shaft 43. A burner having an annular combustion chamber 44 surrounds the rotor and is coaxial with it. The combustion chamber is defined by ceramic refractory walls 45 enclosed by a metallic wall 46. A companion wall 47 surrounds the inner wall to define a passageway 48 for cooling fluid. A plurality of truncated conical inlet ports 50 open into the combustion chamber. The inlets are arranged to communicate with the burner chamber near its radially outer edge, their smaller ends 51 facing the burner nozzles 52. A nozzle mount 53 with air inlet means 54 maintains the nozzle in alignment with the port.

A plurality of couplings 55 are secured to the manifold 56 and the conduits 57 to which the nozzles are attached. The discharge passage 60 for the combustion products is defined in part by a fluid cooled metal wall 61 which also forms a portion of the cooling chamber 62. The front wall 63 of this chamber has a plurality of orifices 64 so that the coolant from this chamber can be discharged therethrough.

In operating this embodiment, cooling fluid such as water was first admitted to the coolant passages 48. Fuel and approximately 70% to about 90% of the oxidant required for combustion were premixed and passed from the manifold 56 to the nozzles 52 where it was ignited. The nozzles directed the flame into the ports 51 which aspirated additional air for combustion through the openings 54. The combustion products were discharged through the passageway 60 across the rotor wall 41 until the area bearing the orifices approached operating temperature. The rotor was driven by means not shown and a stream 70 of glass melt was directed to the interior of the rotor where the centrifugal forces caused it to pass through the orifices 42 to form fibers. The fibers passed radially through the combustion products issuing from the passageway 60 into the blast of steam coolant, discharged from the port 64 and were so attenuated into fine fibers.

An apparatus similar to that shown in FIGURE 1 was constructed for use with a rotor approximately 12" in diameter and having about 10,000 fiber-forming orifices arranged on the side wall in a series of about 20 rows. The burner walls 8 were fabricated from ¼" steel plate and lined with a castable refractory to give a burner chamber with a cross section 3½" wide by 1" tall. A refractory suitable for this purpose was sold under the trademark "Tacor" by Charles Taylor & Sons, of Cincinnati, Ohio. Opening into the combustion chamber were eight ports equally spaced about its periphery, the inlets being 3" in diameter where they entered the chamber and 1⅝" in diameter at the inlet port 10. Located to direct a flame into the port were eight nozzles, each rated at 268,000 B.t.u. per hour at 12" of water pressure.

The mounting brackets and the nipples were adjusted so that the burners were located ¼" away from the inlet ports. Two thousand cubic feet of natural gas (about 86 pounds) premixed with seventeen thousand cubic feet of air (about 1300 pounds) were fed per hour to the manifold and thence to the burner nozzles. An estimated 3000 cubic feet of air (about 225 pounds) per hour was aspirated into the burner chamber. A low-velocity stream of combustion products issued at about 200 ft. per second from the discharge passage across the wall of the centrifuge. The velocity of the high temperature gases, of course, varied with the amount of fuel consumed, but the preferred range was between about 100 and about 300 feet per second.

Steam at 50 pounds per square inch was fed to the coolant chamber 22 and issued from the annular slot, 1/16" wide, in a high velocity blast. The passage of the steam along the inside of the wall 21 served to keep it cool despite the passage of the combustion products on its other side, at the same time these combustion products served to superheat the steam before its discharge from the slot. Glass melt at the rate of 1,000 pounds per hour was fed to the centrifuge which was rotated at a speed of 2400 revolutions per minute and was formed into fibers having an average diameter of about 6 microns.

It should be particularly noted that the novel configuration of this attenuating apparatus permits access to the rear of the rotor during the fiberizing operation so that the glass melt may be introduced directly and additional supplemental burners applied to the interior of the centrifuge if desired.

The foregoing embodiments were disclosed by way of example only and many additional modifications may be made. It is thus contemplated to cover any such modifications as fall within the true spirit and scope of this invention as defined by the appended claims.

I claim:

1. In a fiber forming apparatus including a centrifugal rotor with a side wall having a plurality of fiber forming orifices in a working area on said wall, an annular burner coaxial with and encircling said rotor, said burner comprising refractory walls defining an annular combustion chamber having a substantially rectangular cross section with a radial dimension larger than its axial dimension, refractory inlet means including a plurality of truncated conical ports with their axes approximately normal to the radial walls of said chamber and having their larger ends opening into said chamber near its outer radial edge, burner nozzle mounting means including air induction means adjacent the smaller end of each port and discharge means communicating with the inner edge of said chamber and adapted to direct combustion products across the rotor working area, said inlet means and discharge means lying on the downstream side of the combustion chamber.

2. The apparatus of claim 1 including cooling means associated with the discharge means.

3. The apparatus of claim 2 wherein the cooling means is defined by a wall downstream from the discharge means, said wall defining an outlet adjacent said discharge means.

4. In a fiber forming apparatus including a centrifugal rotor with a side wall having a plurality of fiber forming orifices in a working area on said wall, an annular burner coaxial with and encircling said rotor, said burner comprising refractory walls defining an annular combustion chamber having a substantially rectangular cross section with a radial dimension at least three times its axial dimension, refractory inlet means including a plurality of truncated conical ports with their axes normal to the radial walls of said chamber and having their larger ends opening into said chamber near its outer radial edge, burner nozzle mounting means including air induction means adjacent the smaller end of each port and discharge means communicating with the inner edge of said chamber and adapted to convey about 1600 lbs./hr. of combustion products to said rotor working area at a temperature of about 2500 degrees F. and a velocity of less than about 300 feet per second, said inlet means and discharge means lying on the downstream side of the combustion chamber.

5. The apparatus of claim 4 including a wall defining a steam chamber contiguous with and downstream from said discharge means, said wall having outlets to direct steam blasts codirectionally with said combustion products.

6. An attenuating apparatus for use with a centrifugal fiberizing rotor comprising an annular burner coaxial with and encircling said rotor, said burner comprising refractory walls defining an annular combustion chamber having a substantially rectangular cross section with the radial dimension at least three times its axial dimension, metal walls enclosing said refractory liner, cooling means associated with said metal walls, refractory inlet means including a plurality of truncated conical ports with their axes substantially normal to the radial walls of said chamber and having their larger ends opening into said chamber near its outer radial edge, a burner nozzle adjacent to and exterior of each inlet port, a gas manifold downstream from said attenuating device, adjustable spacing means extending from said gas manifold to said attenuating device, gas conduits extending from said manifold to each burner nozzle as its sole support, discharge means communicating with the inner edge of said chamber and adapted to direct combustion products adjacent the periphery of the rotor, and steam blast means encircling said discharge means.

7. The apparatus of claim 6 including a wall defining a steam chamber contiguous with and downstream from said discharge means, said wall having outlets to direct steam blasts codirectionally with said combustion products.

8. An attenuating apparatus for use with a centrifugal fiberizing rotor comprising an annular burner coaxial with and encircling said rotor, said burner comprising refractory walls defining an annular combustion chamber having a substantially rectangular cross section with the radial dimension at least three times its axial dimension, metal walls enclosing said refractory liner, cooling means associated with said metal walls, refractory inlet means including a plurality of truncated conical ports with their axes substantially normal to the radial walls of said chamber and having their larger ends opening into said chamber near its outer radial edge, a burner nozzle adjacent to and exterior of each inlet port, a gas manifold downstream from said attenuating device, a gas conduit extending from said manifold to each burner nozzle, locating means intermediate said nozzles and said inlet ports, discharge means communicating with the inner edge of said chamber and adapted to direct combustion products adjacent to periphery of the rotor, and steam blast means encircling said discharge means.

9. The apparatus of claim 8 including a wall defining a steam chamber contiguous with and downstream from said discharge means, said wall having outlets to direct steam blasts codirectionally with said combustion products.

References Cited

UNITED STATES PATENTS

| | | | |
|---|---|---|---|
| 2,624,912 | 1/1953 | Heymes et al. | 65—6 |
| 2,991,507 | 7/1961 | Levecque et al. | 65—5 X |
| 3,044,110 | 7/1962 | Hess | 65—14 |
| 3,233,990 | 2/1966 | Stephens et al. | 65—6 |

DONALL H. SYLVESTER, *Primary Examiner.*

R. L. LINDSAY, *Assistant Examiner.*

UNITED STATES PATENT OFFICE
CERTIFICATE OF CORRECTION

Patent No. 3,350,184                  October 31, 1967

William F. Porter

It is certified that error appears in the above identified patent and that said Letters Patent are hereby corrected as shown below:

Column 1, line 13, "perforate" should read -- a perforate --; line 16, "anl" should read -- and --; line 38, "provile" should read -- provide --. Column 2, line 30, before "90%" insert -- about --. Column 4, lines 47 and 73, "refractory liner", each occurrence, should read -- refractory walls --. Column 4, lines 54 and 56 and Column 5, line 5, "attenuating device", each occurrence, should read -- annular burner --. Column 5, line 10, "to" should read -- the --.

Signed and sealed this 9th day of September 1969.

(SEAL)
Attest:

Edward M. Fletcher, Jr.            WILLIAM E. SCHUYLER, JR.
Attesting Officer                    Commissioner of Patents